United States Patent Office 3,392,008
Patented July 9, 1968

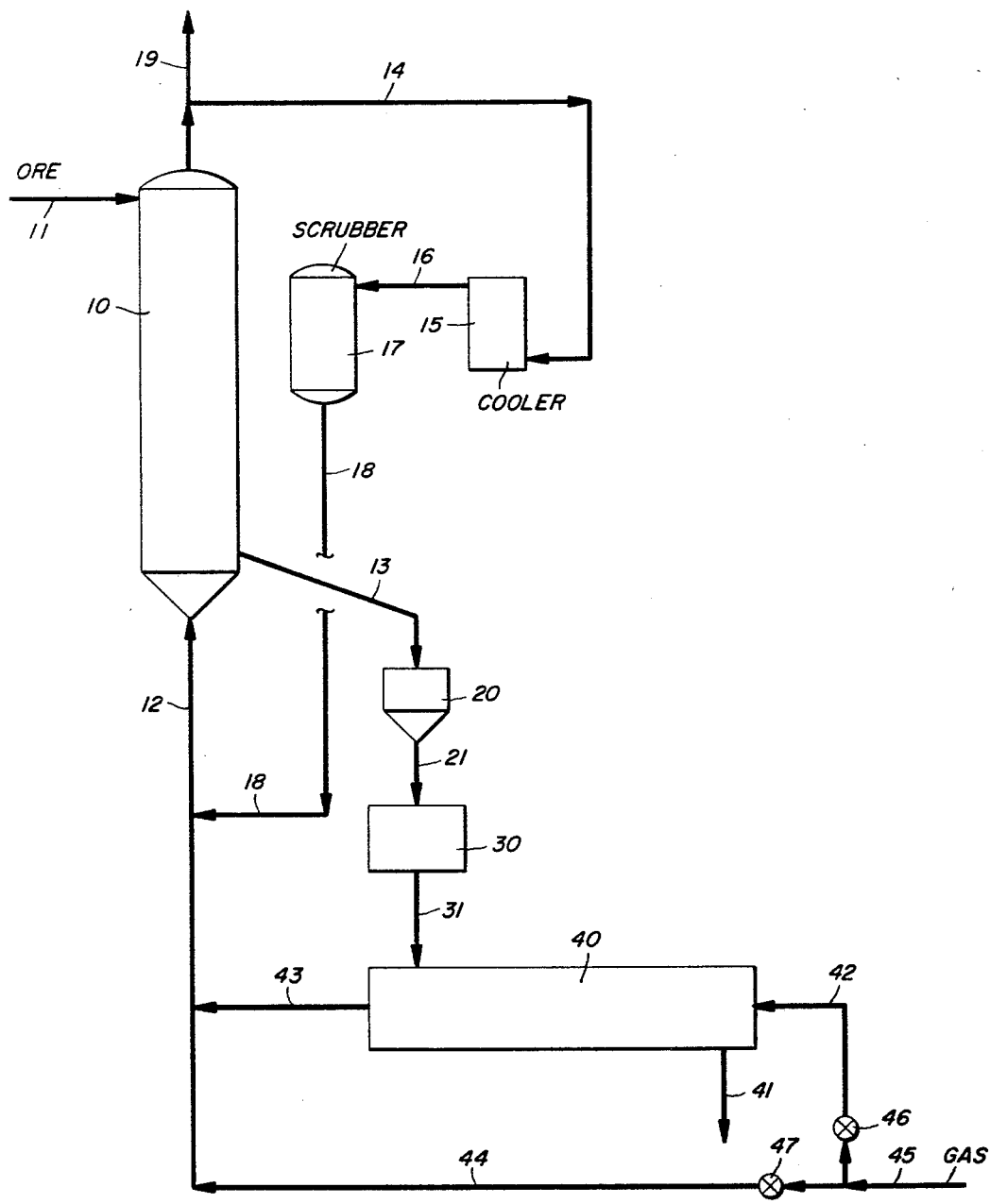

3,392,008
PRODUCTION OF IRON
Emil Wardlaw Wald, Baton Rouge, La., assignor to Esso Research and Engineering Company, a corporation of Delaware
Filed July 29, 1965, Ser. No. 475,784
8 Claims. (Cl. 75—34)

This invention relates to the art of producing metallic or reduced iron by reaction of iron ores by direct contact with reducing gases. In particular, it relates to an improved iron ore reduction process wherein fluidized iron ores are metallized by direct contact with hydrogen, carbon monoxide, or mixtures of these and other gases.

In the more advanced direct iron ore reduction processes, particulate oxidic iron ores, e.g. ores containing or consisting essentially of iron oxides, are staged in a series of beds, stages or zones, directly contacted and fluidized by ascending gases, and reduced, at temperatures ranging from about 1000° F. up to just below the sintering temperature of the ore. The sintering temperature for most ores is generally about 1800° F., but is much less where the degree of metallization of the respective ore has been increased. In such processes the ore is progressively reduced as it descends by flowing downwardly from one bed to a succeeding bed.

In a typical process the particulate ore is reduced in an initial bed, or beds, from, e.g., ferric oxide to magnetite or magnetic oxide of iron, in a succeeding bed, or beds, from magnetite (or mixture approximating the magnetite formula) to ferrous oxide and, finally in another bed, or beds, from ferrous oxide to metallic iron. Generally, the reduced iron product ranges from about 85 to about 95 percent, and higher, metallization.

In such processes, upon withdrawal of the particulate reduced iron product from the last stage of the series of reduction stages, the particulate metal is usually compacted between opposing solid surfaces or extruded and formed into rigid shapes or briquettes. This, inter alia, simplifies and facilitates handling and shipping.

In one form of apparatus the particulate reduced iron product is withdrawn from the process at dull red heat and, while protected from the atmosphere by a blanketing layer of inert gas, i.e. nitrogen, the particulate iron is compressed between pairs of rollers to form metal films, strips or sheets. In another form of apparatus, the hot particulate metal is poured into the nip of a pair of opposed rolls containing pockets within which the iron powder is compacted under high pressure into briquettes. Upon sufficient cooling the briquettes, which have highly activated surfaces, are discharged to the atmosphere.

In certain of such processes the reducing gases are produced externally of the iron ore reduction process by partial oxidation of hydrocarbons and then injected into the iron ore reduction process. Thus, partial combustion of a hydrocarbon, e.g. natural gas or methane, with an oxygen-containing gas, e.g. air (oxygen) produces a mixture of carbon monoxide, hydrogen, and other gaseous products. By use of a water gas-shift reaction water is converted to hydrogen and carbon monoxide further oxidized to carbon dioxide. Hydrogen can thus be produced and carbon dioxide and excess water scrubbed out of the gases to produce a hydrogen enriched reducing gas. In another type of process, the hydrocarbon gases are directly injected into the iron ore reduction process and the reducing gases generated in situ. The latter type of process, referred to as direct injection, can offer certain advantages.

In the formation of briquettes from any iron ore reduction process the problem of cooling briquettes is a problem of major proportions. This is because it is difficult to provide a suitable method for preventing back-oxidation or reoxidation of the metal. Various types of sprays and quenching fluids are not satisfactory and often introduce new problems. While the technique of blanking rigid shapes or briquettes with a layer of inert gas has provided some measure of satisfaction, considerable time is required to cool the briquettes to a sufficiently low temperature for discharge in the atmosphere. Moreover, cooling the briquettes in such manner represents a considerable loss of heat for the briquettes must be cooled down from, e.g., over 1000° F. to a temperature at which they are not so readily and spontaneously back-oxidized, e.g., less than about 400° F. and most often generally about 200° F., or less. Even when adequately cooled prior to discharge, the clean activated metal surfaces of the briquettes are readily attacked by atmospheric oxygen, particularly in humid or moist environments. For these and other reasons, there is need in the art for an improved process for handling hot reduced particulate iron or powder, and especially for a new and improved briquetting process for processing the highly activated iron powder resultant from a fluidized iron ore reduction process.

It is, accordingly, the primary objective of the present invention to overcome the foregoing and other prior art deficiencies and to provide the art with such new and improved processes. In particular, it is an object to provide a new and improved process combination which will quench and cool the reduced iron powder, rigid shapes or briquettes, and simultaneously provide a protective coating upon the metal surfaces. More particularly, it is an objective to achieve the foregoing and, at the same time, enhance the reducing qualities of the reducing gases fed into the iron ore reduction process.

These and other objectives are achieved in accordance with the present invention which contemplates the steps of discharging particulate reduced iron product from an iron ore reduction process, contacting a hydrocarbon, or mixture of hydrocarbon, with the hot reduced iron product to quench and cool the latter and simultaneously to heat and crack the hydrocarbon, or hydrocarbons, and to form a reaction product of gases and free carbon, a substantial proportion of the latter of which is deposited as a coating upon the metallic surfaces. The hot gaseous portion of the reaction product is fed into the iron ore reduction process.

Preferably, the hot reduced iron product is withdrawn from the process, formed into a rigid shape or briquette and then contacted with a hydrocarbon, or mixture of hydrocarbons. In this way, the temperature of the metallic iron remains high during its formation to cause the bonding together of the individual particles and improvement of the strength of the briquette, and yet the surface of the briquette is adequately covered by a protective layer of carbon and it is sufficiently rapidly cooled for discharge to the atmosphere. Preferably, the particulate reduced iron is contacted with the hydrocarbon, or mixture thereof, while at a temperature ranging from about 1000 F. to about 2000° F. and more preferably from about 1400° F. to about 1800° F. Moreover, in the reaction the reducing qualities of the hydrocarbon, or mixture of hydrocarbons, is improved.

A feature of this invention resides in the unique properties of the hydrocarbon, or hydrocarbons, when employed in the manner herein utilized. Hence, the hydrocarbon is not a mere diluent for cooling the metal. Instead, it reacts with the small amount of oxygen of the remaining unreduced iron oxides. The endothermic reaction which results outside the reduction zones when the hydrocarbon decomposes quenches or cools the metal; and further enhances the quality of the briquettes by increasing the degree of metallization. Simultaneously, the decomposition hydrocarbon lays down a protective layer of carbon. The carbon protects against back-oxidation, and provides fuel if the briquette is later charged to a steel-making furnace. Moreover, the hydrocarbon, or hydrocarbon mixture, is cracked to produce carbon monoxide and hydrogen gases, and the gaseous effluent which is fed in to the fluidized iron ore reduction process is not only richer in reducing potential but is even preheated in the exchange. These and other advantages result in the present unique process combination.

In the practice of this invention, hydrocarbons ranging from about one to about 24 carbon atoms, and higher, in the molecule provide highly satisfactory results, those of the higher molecular weights producing the greater amount of reaction products at a given decomposition temperature. Preferably, however, the normally gaseous and liquid hydrocarbons, particularly the former, are more often used because of their wide availability, relative low cost and suitability to reaction conditions. The normally liquid hydrocarbons, however, offer certain advantages in processing.

The invention will be better understood by reference to the enclosed schematic diagram or flow sheet and to the following detailed description which makes reference to the diagram.

Referring to the diagram is shown a reactor 10 within which is contained a series of fluidized beds of ore at different stages of reduction. Finely divided oxidic iron ore, e.g., hematite or ferric oxide ($Fe_2O_3$), is fed into the top of reactor 10 via line 11 and fluidized by reducing gases, e.g., a mixture of carbon monoxide and hydrogen, injected into the bottom of the reactor via line 12. A portion of the gas is oxidized upon ascent through the reactor 10 and the oxidic iron ore is reduced through its several oxidation states to substantially metallic iron upon descent from one fluidized bed to the next of the series.

Spent gases can be regenerated in the process by removal of water or carbon dioxide, or both, which products of reaction lessen the reducing power of the gas. The gas is thus regenerated, first via passage through line 14 to cooler 15 wherein a portion of the water formed during the reaction is cooled and removed by precipitation. Thence the partially treated gas is transferred via line 16 to carbon dioxide adsorber 17 wherein the carbon dioxide is removed. Monomethanol amine, for example, can be used as the scrubbing agent. The regenerated gas is then passed via line 18 into line 12 for reintroduction into the reactor 10. To prevent accumulation of inerts, a portion of the gas can be vented from reactor 10 as via line 19.

Particulate metallic iron is withdrawn from reactor 10 via line 13 and fed into closed hopper 20. The metallized product is then passed via line 21 into housing 30, within which is contained a compaction apparatus, e.g., a press or extruder, for forming rigid shapes or briquettes. A double roll press (not shown) e.g., is provided therein and the particulate metallic product, while protected from oxidation by a blanketing layer of nitrogen, is pressed while hot to form a sheet; or one or more of the rolls are provided with indentations, or pockets, and individual briquettes are formed. It is found that particulate iron product, 85 to 95 percent metallized, can be satisfactorily pressed at temperatures ranging from about 1000° F. to about 2000° F., and more preferably, from about 1400° F. to about 1800° F. Pressures ranging from about 50 to several hundred pounds per square inch, e.g., 800 pounds per square inch, but preferably from about 100 to about 200 pounds per square inch pressure, or higher, can be employed to provide briquettes of suitable strength. After formation of the briquettes in the inert atmosphere, and while still hot, the briquettes are discharged via line 31 into the conveyer cooler 40 for further processing.

Within the conveyer cooler 40 can be provided, within a housing, a pair, or more, of rollers which carry an endless belt, or belts, for conveying briquettes loaded thereon from below the point of discharge 31 to the opposite end of the conveyer cooler 40 for discharge via conduit 41. Briquettes at temperatures ranging from about 1000° F. to about 2000° F., and preferably from about 1400° F. to about 1800° F., are contacted with a hydrocarbon, or mixture of hydrocarbons, e.g., methane or natural gas, injected into cooler conveyer 40 via line 42. Upon contact of the hydrocarbon with the hot surfaces of the briquettes the hydrocarbon is cracked, or partially cracked, the gases exiting from conveyer cooler 40 via line 43.

In the embodiment described, a portion of the hydrocarbon can be introduced from line 45 into the conveyer cooler 40 via open valve 46 and line 42, while a portion thereof bypasses the conveyor cooler via open valve 47 and line 44. In this manner the cracked gases (and unreacter hydrocarbons) and fresh hydrocarbon feed streams can be manifolded via line 43, 44 into line 12 along with preheated regenerated reducing gases from line 18. Thus, the desired degree of cracking and carbon lay-down or carbon coating upon the briquettes is readily provided and the desired temperature and quantum of reducing gas components fed into the reactor 10 readily controlled.

It is apparent that various modifications are possible without departing from the spirit and scope of the invention.

Having described the invention, what is claimed is:

1. In a process for the production of metallic iron wherein particulate iron ore solids are fed into a zone, contacted with gas, reduced, particulate metallic iron withdrawn from the process and compacted at elevated temperatures into a rigid shape, the improvement comprising contacting the rigid shape outside the zone with a hydrocarbon to preheat, crack and decompose the hydrocarbon while laying down a carbon coating on the rigid shape, withdrawing the gaseous product of the decomposition reaction and feeding same into the said zone.

2. In a process for the production of metallic iron wherein particulate oxidic iron ores are fed into a zone, contacted with gas, reduced, particulate metallic iron withdrawn from the process and, while at elevated temperatures ranging from about 1000° F. to about 2000° F., pressed into a rigid shape in an inert atmosphere, the improvement comprising the additional steps of separating the rigid shape from the inert atmosphere, contacting the hot rigid shape with a hydrocarbon to preheat, crack and decompose the hydrocarbon while laying down a carbon coating on the rigid shape, withdrawing the gaseous product of the decomposition reaction and feeding same into the said zone, and recovering the rigid shape.

3. The process of claim 2 wherein the hydrocarbon is one containing from one to about 24 carbon atoms and the rigid shape is at a temperature ranging from about 1000° F. to about 2000° F. at the time of contact with said hydrocarbons.

4. The process of claim 2 wherein the hydrocarbon is one selected from normally gaseous and normally liquid hydrocarbons.

5. In a process for the production of metallic iron the combination comprising feeding particulate oxidic iron ore solids into a reduction zone, contacting said ore with reducing gas to mettalize the ore, withdrawing particulate metallic iron from the reduction process, compacting the metallized ore at temperatures ranging from about 1000° F. to about 2000° F., while providing a blanketing layer of inert gas, to form briquettes, withdrawing the briquettes from the zone containing the inert atmosphere, and then contacting the briquettes at temperatures ranging from about 1000° F. to about 2000° F. with a hydrocarbon to preheat, crack and decompose the hydrocarbon while laying down a carbon coating on the briquettes, withdrawing the gaseous product from said decomposition reaction and feeding same into the reduction zone.

6. The process of claim 5 wherein the briquettes are from about 85 to about 98 percent metallized at the time of contact with the hydrocarbon.

7. The process of claim 5 wherein the hydrocarbon is one containing from one to about 24 carbon atoms and the briquettes are at temperatures ranging from about 1400° F. to about 1800° F. at the time of contact with the hydrocarbon.

8. The process of claim 7 wherein the hydrocarbon is one selected from normally gaseous and normally liquid hydrocarbon.

References Cited
UNITED STATES PATENTS

| | | | |
|---|---|---|---|
| 2,874,037 | 2/1959 | Fisher | 75—34 |
| 2,971,752 | 2/1961 | Madaras | 75—33 |
| 3,072,474 | 1/1963 | Atkinson et al. | 75—33 |
| 3,205,065 | 9/1965 | Mayer et al. | 75—26 |
| 3,231,366 | 1/1966 | Schenck et al. | 75—26 |
| 3,282,677 | 11/1966 | Futakuchi et al. | 75—33 X |

HYLAND BIZOT, *Primary Examiner.*

H. W. TARRING, *Assistant Examiner.*

UNITED STATES PATENT OFFICE
CERTIFICATE OF CORRECTION

Patent No. 3,392,008                                        July 9, 1968

Emil Wardlaw Wald

It is certified that error appears in the above identified patent and that said Letters Patent are hereby corrected as shown below:

In the heading to the drawing, line 1, "E. W. WARD" should read -- E. W. WALD --.

Signed and sealed this 17th day of February 1970.

(SEAL)
Attest:

Edward M. Fletcher, Jr.                                WILLIAM E. SCHUYLER, JR.

Attesting Officer                                             Commissioner of Patents